US007879744B2

(12) United States Patent
Seidling et al.

(10) Patent No.: US 7,879,744 B2
(45) Date of Patent: *Feb. 1, 2011

(54) STABILIZED DECOLORIZING COMPOSITION

(75) Inventors: Jeffery R. Seidling, Neenah, WI (US); Scott W. Wenzel, Neenah, WI (US); Molly K. Smith, Atlanta, GA (US); Michael Schubert, Waukesha, WI (US); J. Gavin MacDonald, Decatur, GA (US); David W. Koenig, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 341 days.

This patent is subject to a terminal disclaimer.

(21) Appl. No.: 11/847,549

(22) Filed: Aug. 30, 2007

(65) Prior Publication Data

US 2009/0061718 A1 Mar. 5, 2009

(51) Int. Cl.
*B32B 27/04* (2006.01)
*A01N 39/00* (2006.01)

(52) U.S. Cl. .......................... 442/93; 442/121; 424/616

(58) Field of Classification Search .................. 442/59, 442/93, 121, 327; 106/34, 124.1; 252/184; 424/10.3, 616
See application file for complete search history.

(56) References Cited

U.S. PATENT DOCUMENTS

| | | | |
|---|---|---|---|
| 3,338,992 | A | 8/1967 | Kinney |
| 3,341,394 | A | 9/1967 | Kinney |
| 3,494,821 | A | 2/1970 | Evans |
| 3,502,538 | A | 3/1970 | Petersen |
| 3,502,763 | A | 3/1970 | Hartmann |
| 3,542,615 | A | 11/1970 | Dobo et al. |
| 3,635,828 | A | 1/1972 | Benjamin et al. |
| 3,692,618 | A | 9/1972 | Dorschner et al. |
| 3,802,817 | A | 4/1974 | Matsuki et al. |
| 3,849,241 | A | 11/1974 | Butin et al. |
| 4,100,324 | A | 7/1978 | Anderson et al. |
| 4,130,501 | A | 12/1978 | Lutz et al. |
| 4,144,370 | A | 3/1979 | Boulton |
| 4,340,563 | A | 7/1982 | Appel et al. |
| 4,640,810 | A | 2/1987 | Laursen et al. |
| 5,259,848 | A | 11/1993 | Terry et al. |
| 5,284,703 | A | 2/1994 | Everhart et al. |
| 5,350,624 | A | 9/1994 | Georger et al. |
| 5,382,400 | A | 1/1995 | Pike et al. |
| 5,527,892 | A | 6/1996 | Borsotti et al. |
| 5,540,332 | A | 7/1996 | Kopacz et al. |
| 5,667,635 | A | 9/1997 | Win et al. |
| 5,703,036 | A | 12/1997 | Iakovides |
| 5,767,055 | A | 6/1998 | Choy et al. |
| 5,770,543 | A | 6/1998 | Garst et al. |
| 5,785,179 | A | 7/1998 | Buczwinski et al. |
| 5,853,430 | A | 12/1998 | Shindo et al. |
| 5,872,090 | A | 2/1999 | You et al. |
| 5,888,524 | A | 3/1999 | Cole |
| 5,895,504 | A | 4/1999 | Sramek et al. |
| 5,900,187 | A | 5/1999 | Scialla et al. |
| 5,904,734 | A | 5/1999 | Friberg et al. |
| 5,929,012 | A | 7/1999 | Del Duca et al. |
| 5,964,351 | A | 10/1999 | Zander |
| 5,997,585 | A | 12/1999 | Scialla et al. |
| 6,001,794 | A | 12/1999 | Del Duca et al. |
| 6,028,018 | A | 2/2000 | Amundson et al. |
| 6,030,331 | A | 2/2000 | Zander |
| 6,066,610 | A | 5/2000 | Sramek |
| 6,158,614 | A | 12/2000 | Haines et al. |
| 6,171,346 | B1 | 1/2001 | Yeazell et al. |
| 6,187,738 | B1 | 2/2001 | Micciche et al. |
| 6,269,969 | B1 | 8/2001 | Huang et al. |
| 6,269,970 | B1 | 8/2001 | Huang et al. |
| 6,273,359 | B1 | 8/2001 | Newman et al. |
| 6,277,105 | B1 | 8/2001 | Rynish |
| 6,315,864 | B2 | 11/2001 | Anderson et al. |
| 6,376,444 | B1 | 4/2002 | Hortel et al. |
| 6,391,840 | B1 | 5/2002 | Thompson et al. |
| 6,420,332 | B1 | 7/2002 | Simpson |
| 6,437,199 | B1 | 8/2002 | Oka et al. |
| 6,440,437 | B1 | 8/2002 | Krzysik et al. |

(Continued)

FOREIGN PATENT DOCUMENTS

| | | | |
|---|---|---|---|
| EP | 1059032 | A1 | 12/2000 |

(Continued)

OTHER PUBLICATIONS

Search Report and Written Opinion for PCT/IB2008/052758 dated Oct. 27, 2008.

(Continued)

*Primary Examiner*—Arti Singh-Pandey
(74) *Attorney, Agent, or Firm*—Dority & Manning, P.A.

(57) ABSTRACT

A decolorizing composition that can discharge the color of blood, menses, or other stains is provided. More specifically, a peroxide, cell lysing agent, chelating agent, antioxidant, and other optional ingredients are selectively employed to achieve an aqueous composition that exhibits good shelf stability and stain removal properties. The composition, for example, may maintain about 70% or more, in some embodiments about 80% or more, and in some embodiments, about 90% or more of its initial hydrogen peroxide ($H_20_2$) content subsequent to being aged at ambient temperature (~25° C.) for 2 weeks.

25 Claims, No Drawings

U.S. PATENT DOCUMENTS

| | | | |
|---|---|---|---|
| 6,471,728 | B2 | 10/2002 | Smith et al. |
| 6,495,501 | B1 | 12/2002 | Del Duca et al. |
| 6,579,838 | B2 | 6/2003 | Housmekerides et al. |
| 6,644,879 | B2 | 11/2003 | Irvin et al. |
| 6,653,269 | B2 | 11/2003 | Housmekerides et al. |
| 6,689,730 | B2 | 2/2004 | Hortel et al. |
| 6,730,819 | B1 | 5/2004 | Pesce |
| 6,753,306 | B2 | 6/2004 | Simpson |
| 6,832,867 | B2 | 12/2004 | Sandbach et al. |
| 6,838,423 | B2 | 1/2005 | Irvin et al. |
| 6,846,332 | B2 | 1/2005 | Boissie et al. |
| 7,047,582 | B2 | 5/2006 | Moe et al. |
| 7,148,187 | B1 | 12/2006 | Simon et al. |
| 7,182,537 | B2 | 2/2007 | Policicchio et al. |
| 7,462,590 | B2 | 12/2008 | Tichy et al. |
| 2001/0014656 | A1 | 8/2001 | Smith et al. |
| 2002/0091070 | A1 | 7/2002 | Engisch et al. |
| 2002/0174500 | A1 | 11/2002 | Micciche et al. |
| 2003/0109411 | A1 | 6/2003 | Kilkenny et al. |
| 2003/0119209 | A1 | 6/2003 | Kaylor et al. |
| 2004/0231061 | A1 | 11/2004 | Irvin et al. |
| 2005/0026802 | A1 | 2/2005 | Kilkenny et al. |
| 2005/0227893 | A1 | 10/2005 | Johnson et al. |
| 2006/0053567 | A1 | 3/2006 | Sandbach et al. |
| 2006/0202160 | A1 | 9/2006 | Faryniarz et al. |
| 2006/0204530 | A1 | 9/2006 | Ramirez et al. |
| 2007/0001145 | A1 | 1/2007 | Faryniarz et al. |
| 2008/0132438 | A1 * | 6/2008 | Hoffman et al. ............ 510/380 |
| 2009/0062172 | A1 | 3/2009 | Cunningham et al. |

FOREIGN PATENT DOCUMENTS

| | | | |
|---|---|---|---|
| GB | 2397823 | A | 8/2004 |
| JP | 7082592 | A | 3/1995 |
| JP | 2001275909 | A | 10/2001 |
| WO | WO2004067194 | A2 | 8/2004 |
| WO | WO2004067194 | A3 | 8/2004 |

OTHER PUBLICATIONS

English Abstract of JP2000144200, published May 26, 2000, European Patent Office.

Friedman et al. "Field Guide to Stains: How to Identify and Remove Virtually Every Stain Known to Man" Quirk Publications, Inc. 2002: pp. 199-202.

Seeing Spots? Don't Rely on Quick Stain Removers, *Consumer Reports*, Aug. 2006, p. 9.

Stain Removers: Which are Best, *Consumer Reports*, Mar. 2000, p. 52.

* cited by examiner

STABILIZED DECOLORIZING COMPOSITION

BACKGROUND OF THE INVENTION

Blood is traditionally regarded as among the most difficult kinds of stain, along with ink and grease, to clean and remove. Removing blood stains, for example, from clothing is an arduous and timely process where care has to be used so as not to set the stain into the fabric permanently. The typical process involves rinsing the fabric with cold salt water (not hot water as this would set the stain into the fabric making it almost impossible to remove). Next, the fabric is soaked in cold water containing an enzyme-based detergent or meat tenderizer for about 30-60 minutes. One would then apply a laundry pre-soak and then launder with enzyme-based detergent. (See e.g., FIELD GUIDE TO STAINS, pp. 199-202, Quirk Publications, Inc. ©2002.) This course of treatment can be truly a time consuming process. Recent stain removers use an oxidant method for removing blood stains, for example, applying an oxidizing agent to the stain-affected area. U.S. Pat. No. 6,730,819 describes the use of oxidizing agents, including oxides, peroxides, ozonides, and superoxides. It is believed, however, that such compositions lack sufficient stability over time to deliver good stain removal properties during actual usage. As such, a need currently exists for a stain remover that works well on blood, ink, grease, or other difficult stains.

SUMMARY OF THE INVENTION

In accordance with one embodiment of the present invention, a method for changing the color of a stain is disclosed. The method comprises forming a decolorizing composition that comprises from about 0.10 wt. % to about 10 wt. % of at least one peroxide, from about 0.1 wt. % to about 10 wt. % of at least one cell lysing agent, from about 0.05 wt. % to about 10 wt. % of at least one chelating agent, from about 0.0005 wt. % to about 5 wt. % of at least one antioxidant, and from about 50 wt. % to about 99.9 wt. % of at least one solvent. The stain is contacted with the decolorizing composition, wherein the stain undergoes a detectable change in color change in about 30 minutes or less after contacting the decolorizing composition.

In accordance with another embodiment of the present invention, a decolorizing composition is disclosed that comprises hydrogen peroxide in an amount of from about 0.10 wt. % to about 10 wt. %, from about 0.1 wt. % to about 10 wt. % of at least one surfactant, from about 0.05 wt. % to about 10 wt. % of at least one chelating agent, from about 0.0005 wt. % to about 5 wt. % of at least one antioxidant, and from about 50 wt. % to about 99.9 wt. % of water.

In accordance with still another embodiment of the present invention, a wipe is disclosed that comprises a nonwoven web and an aqueous solution that constitutes from about 150 wt. % to about 600 wt. % of the dry weight of the wipe. The solution comprises hydrogen peroxide in an amount of from about 0.10 wt. % to about 10 wt. %. The solution further comprises at least one surfactant, at least one chelating agent, and at least one antioxidant.

Other features and aspects of the present invention are discussed in greater detail below.

DETAILED DESCRIPTION OF REPRESENTATIVE EMBODIMENTS

Definitions

As used herein the term "nonwoven web" generally refers to a web having a structure of individual fibers or threads which are interlaid, but not in an identifiable manner as in a knitted fabric. Examples of suitable nonwoven webs include, but are not limited to, meltblown webs, spunbond webs, carded webs, airlaid webs, etc. The basis weight of the nonwoven web may vary, such as from about 5 grams per square meter ("gsm") to 120 gsm, in some embodiments from about 10 gsm to about 70 gsm, and in some embodiments, from about 15 gsm to about 35 gsm.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

As used herein, the term "carded web" refers to a web made from staple fibers that are sent through a combing or carding unit, which separates or breaks apart and aligns the staple fibers in the machine direction to form a generally machine direction-oriented fibrous nonwoven web. Such fibers are usually obtained in bales and placed in an opener/blender or picker, which separates the fibers prior to the carding unit. Once formed, the web may then be bonded by one or more known methods.

As used herein, the term "airlaid web" refers to a web made from bundles of fibers having typical lengths ranging from about 3 to about 19 millimeters (mm). The fibers are separated, entrained in an air supply, and then deposited onto a forming surface, usually with the assistance of a vacuum supply. Once formed, the web is then bonded by one or more known methods.

DETAILED DESCRIPTION

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a decolorizing composition that can discharge the color of blood, menstrual fluid, or other difficult stains. More specifically, a peroxide, cell lysing agent, chelating agent, antioxidant, and other optional ingredients are selectively employed to achieve an aqueous composition that exhibits good shelf stability and stain removal properties. The composition, for example, may maintain about 70% or more, in some embodiments about 80% or more, and in some embodiments, about 90% or more of its initial hydrogen peroxide ($H_2O_2$) content subsequent to being aged at ambient temperature (~25° C.) for 2 weeks.

The decolorizing composition may be formed from hydrogen peroxide or any other compound capable of releasing hydrogen peroxide when present in an aqueous solution. Suitable hydrogen peroxide sources may include, for example, peroxides of alkali and alkaline earth metals, organic peroxy compounds, peroxy acids, pharmaceutically-acceptable salts thereof, and mixtures thereof. Peroxides of alkali and, alkaline earth metals include lithium peroxide, potassium peroxide, sodium peroxide, magnesium peroxide, calcium peroxide, barium peroxide, and mixtures thereof. Organic peroxy complexes may also be employed, such as carbamide peroxide (also known as urea peroxide), glyceryl hydrogen peroxide, alkyl hydrogen peroxides, dialkyl peroxides, alkyl peroxy acids, peroxy esters, diacyl peroxides, benzoyl peroxide, and monoperoxyphthalate, and mixtures thereof. Peroxy acids and their salts include organic peroxy acids such as alkyl peroxy acids, and monoperoxyphthalate and mixtures thereof, as well as inorganic peroxy acid salts such as persulfate, dipersulfate, percarbonate, perphosphate, perborate and persilicate salts of alkali and alkaline earth metals such as lithium, potassium, sodium, magnesium, calcium and barium, and mixtures thereof.

Regardless of its form, the decolorizing composition typically contains from about 0.1 wt. % to about 10 wt. %, in some embodiments from about 0.2 to about 6 wt. %, in some embodiments from about 0.4 wt. % to about 5 wt. %, and in some embodiments, from about 0.5 wt. % to about 4 wt. % of the peroxide. It should be understood that the above concentration is the initial concentration of the peroxide immediately following formation of the composition. Because peroxides decompose in water, however, its concentration may vary over time. For example, urea peroxide decomposes into urea and hydrogen peroxide in an aqueous solution. The hydrogen peroxide may further decompose into water and oxygen. Regardless, one benefit of the present invention is that the peroxide may be sufficiently stabilized so that the hydrogen peroxide content of the solution may be maintained at substantially the same level for a certain period of time. For example, the hydrogen peroxide content after being aged at room temperature (~25° C.) for 2 weeks may still be from about 0.1 wt. % to about 10 wt. %, in some embodiments from about 0.2 to about 6 wt. %, in some embodiments from about 0.4 wt. % to about 5 wt. %, and in some embodiments, from about 0.5 wt. % to about 4 wt. %.

A cell lysing agent is also employed in the decolorizing composition in an amount from about 0.1 wt. % to about 10 wt. %, in some embodiments from about 0.5 wt. % to about 5 wt. %, and in some embodiments, from about 0.8 wt. % to about 4 wt. % of the decolorizing composition. The cell lysing agent is believed to disrupt the membrane of red blood cells and thereby boost the ability of the peroxide to react with the hemoglobin and alter its color. One particularly suitable type of cell lysing agent is a surfactant, such as a nonionic, anionic, cationic, and/or amphoteric surfactant. Suitable nonionic surfactants may include, for instance, alkyl polysaccharides, amine oxides, block copolymers, castor oil ethoxylates, ceto-oleyl alcohol ethoxylates, ceto-stearyl alcohol ethoxylates, decyl alcohol ethoxylates, dinoyl phenol ethoxylates, dodecyl phenol ethoxylates, end-capped ethoxylates, ether amine derivatives, ethoxylated alkanolamides, ethylene glycol esters, fatty acid alkanolamides, fatty alcohol alkoxylates, lauryl alcohol ethoxylates, mono-branched alcohol ethoxylates, natural alcohol ethoxylates, nonyl phenol ethoxylates, octyl phenol ethoxylates, oleyl amine ethoxylates, random copolymer alkoxylates, sorbitan ester ethoxylates, stearic acid ethoxylates, stearyl amine ethoxylates, synthetic alcohol ethoxylates, tallow oil fatty acid ethoxylates, tallow amine ethoxylates, tridecanol ethoxylates, acetylenic diols, polyoxyethylene sorbitols, and mixtures thereof. Various specific examples of suitable nonionic surfactants include, but are not limited to, methyl gluceth-10, PEG-20 methyl glucose distearate, PEG-20 methyl glucose sesquistearate, $C_{11-15}$ pareth-20, ceteth-8, ceteth-12, dodoxynol-12, laureth-15, PEG-20 castor oil, polysorbate 20, steareth-20, polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, an ethoxylated nonylphenol, ethoxylated octylphenol, ethoxylated dodecylphenol, or ethoxylated fatty ($C_6$-$C_{22}$) alcohol, including 3 to 20 ethylene oxide moieties, polyoxyethylene-20 isohexadecyl ether, polyoxyethylene-23 glycerol laurate, polyoxyethylene-20 glyceryl stearate, PPG-10 methyl glucose ether, PPG-20 methyl glucose ether, polyoxyethylene-20 sorbitan monoesters, polyoxyethylene-80 castor oil, polyoxyethylene-15 tridecyl ether, polyoxyethylene-6 tridecyl ether, laureth-2, laureth-3, laureth-4, PEG-3 castor oil, PEG 600 dioleate, PEG 400 dioleate, and mixtures thereof. Commercially available nonionic surfactants may include the SURFYNOL® range of acetylenic diol surfactants available from Air Products and Chemicals of Allentown, Pa.; the TWEEN® range of polyoxyethylene surfactants available from Fisher Scientific of Pittsburgh, Pa.; and the TRITON® range of polyoxyethylene surfactants (e.g., TRITON® X-100, polyoxyethylene-10 isooctylcyclohexyl ether) available from Sigma-Aldrich Chemical Co. of St. Louis, Mo.

Alkyl glycoside nonionic surfactants may also be employed that are generally prepared by reacting a monosaccharide, or a compound hydrolyzable to a monosaccharide, with an alcohol such as a fatty alcohol in an acid medium. For example, U.S. Pat. Nos. 5,527,892 and 5,770,543, which are incorporated herein in their entirety by reference thereto for all purposes, describe alkyl glycosides and/or methods for their preparation. Commercially available examples of suitable alkyl glycosides include Glucopon™ 220, 225, 425, 600 and 625, all of which are available from Cognis Corp. of Cincinnati, Ohio. These products are mixtures of alkyl mono- and oligoglucopyranosides with alkyl groups based on fatty alcohols derived from coconut and/or palm kernel oil. Glucopon™ 220, 225 and 425 are examples of particularly suitable alkyl polyglycosides. Glucopon™ 220 is an alkyl polyglycoside that contains an average of 1.4 glucosyl residues per molecule and a mixture of 8 and 10 carbon alkyl groups (average carbons per alkyl chain-9.1). Glucopon™ 225 is a related alkyl polyglycoside with linear alkyl groups having 8 or 10 carbon atoms (average alkyl chain-9.1 carbon atoms) in the alkyl chain. Glucopon™ 425 includes a mixture of alkyl polyglycosides that individually include an alkyl group with 8, 10, 12, 14 or 16 carbon atoms (average alkyl chain-10.3 carbon atoms). Glucopon™ 600 includes a mixture of alkyl polyglycosides that individually include an alkyl group with 12, 14 or 16 carbon atoms (average alkyl chain 12.8 carbon atoms). Glucopon™ 625 includes a mixture of alkyl polyglycosides that individually include an alkyl group having 12, 14 or 18 carbon atoms (average alkyl chain 12.8 carbon atoms). Still other suitable alkyl glycosides are available from Dow Chemical Co. of Midland, Mich. under the Triton™ designation, e.g., Triton™ CG-110 and BG-10.

Exemplary anionic surfactants include alkyl sulfates, alkyl ether sulfates, alkyl ether sulfonates, sulfate esters of an alkylphenoxy polyoxyethylene ethanol, (α-olefin sulfonates, β-alkoxy alkane sulfonates, alkylauryl sulfonates, alkyl monoglyceride sulfates, alkyl monoglyceride sulfonates, alkyl carbonates, alkyl ether carboxylates, fatty acids, sulfosuccinates, sarcosinates, octoxynol or nonoxynol phosphates, taurates, fatty taurides, fatty acid amide polyoxyethylene sulfates, isethionates, or mixtures thereof. Particular examples of anionic surfactants include, but are not limited to, $C_8$-$C_{18}$ alkyl sulfates, $C_8$-$C_{18}$ fatty acid salts, $C_8$-$C_{18}$ alkyl ether sulfates having one or two moles of ethoxylation, $C_8$-$C_{18}$ alkamine oxides, $C_8$-$C_{18}$ alkoyl sarcosinates, $C_8$-$C_{18}$ sulfoacetates, $C_8$-$C_{18}$ sulfosuccinates, $C_8$-$C_{18}$ alkyl diphenyl oxide disulfonates, $C_8$-$C_{18}$ alkyl carbonates, $C_8$-$C_{18}$ alpha-olefin sulfonates, methyl ester sulfonates, and blends thereof. The $C_8$-$C_{18}$ alkyl group may be straight chain (e.g., lauryl) or branched (e.g., 2-ethylhexyl). The cation of the anionic surfactant may be an alkali metal (e.g., sodium or potassium), ammonium, $C_1$-$C_4$ alkylammonium (e.g., mono-, di-, tri-), or $C_1$-$C_3$ alkanolammonium (e.g., mono-, di-, tri). More specifically, such anionic surfactants may include, but are not limited to, lauryl sulfates, octyl sulfates, 2-ethylhexyl sulfates, lauramine oxide, decyl sulfates, tridecyl sulfates, cocoates, lauroyl sarcosinates, lauryl sulfosuccinates, linear $C_{10}$ diphenyl oxide disulfonates, lauryl sulfosuccinates, lauryl ether sulfates (1 and 2 moles ethylene oxide), myristyl sulfates, oleates, stearates, tallates, ricinoleates, cetyl sulfates, and similar surfactants.

Amphoteric surfactants may also be employed, such as derivatives of secondary and tertiary amines having aliphatic radicals that are straight chain or branched, wherein one of the aliphatic substituents contains from about 8 to 18 carbon atoms and at least one of the aliphatic substituents contains an anionic water-solubilizing group, such as a carboxy, sulfonate, or sulfate group. Some examples of amphoteric surfactants include, but are not limited to, sodium 3-(dodecylamino)propionate, sodium 3-(dodecylamino)-propane-1-sulfonate, sodium 2-(dodecylamino)ethyl sulfate, sodium 2-(dimethylamino)octadecanoate, disodium 3-(N-carboxymethyl-dodecylamino)propane-1-sulfonate, disodium octadecyliminodiacetate, sodium 1-carboxymethyl-2-undecylimidazole, and sodium N,N-bis(2-hydroxyethyl)-2-sulfato-3-dodecoxypropylamine. Additional classes of amphoteric surfactants include phosphobetaines and the phosphitaines. For instance, some examples of such amphoteric surfactants include, but are not limited to, sodium coconut N-methyl taurate, sodium oleyl N-methyl taurate, sodium tall oil acid N-methyl taurate, sodium palmitoyl N-methyl taurate, cocodimethylcarboxymethylbetaine, lauryldimethylcarboxymethylbetaine, lauryldimethylcarboxyethylbetaine, cetyldimethylcarboxymethylbetaine, lauryl-bis-(2-hydroxyethyl)carboxymethylbetaine, oleyldimethylgammacarboxypropylbetaine, lauryl-bis-(2-hydroxypropyl)-carboxyethylbetaine, cocoamidodimethylpropylsultaine, stearylamidodimethylpropylsultaine, laurylamido-bis-(2-hydroxyethyl)propylsultaine, di-sodium oleamide PEG-2 sulfosuccinate, TEA oleamido PEG-2 sulfosuccinate, disodium oleamide MEA sulfosuccinate, disodium oleamide MIPA sulfosuccinate, disodium ricinoleamide MEA sulfosuccinate, disodium undecylenamide MEA sulfosuccinate, disodium wheat germamido MEA sulfosuccinate, disodium wheat germamido PEG-2 sulfosuccinate, disodium isostearamideo MEA sulfosuccinate, cocoamphoglycinate, cocoamphocarboxyglycinate, lauroamphoglycinate, lauroamphocarboxyglycinate, capryloamphocarboxyglycinate, cocoamphopropionate, cocoamphocarboxypropionate, lauroamphocarboxypropionate, capryloamphocarboxypropionate, dihydroxyethyl tallow glycinate, cocoamido disodium 3-hydroxypropyl phosphobetaine, lauric myristic amido disodium 3-hydroxypropyl phosphobetaine, lauric myristic amido glyceryl phosphobetaine, lauric myristic amido carboxy disodium 3-hydroxypropyl phosphobetaine, cocoamido propyl monosodium phosphitaine, lauric myristic amido propyl monosodium phosphitaine, and mixtures thereof.

Cationic surfactants may also be employed in the present invention, such as alkyl dimethylamines, alkyl amidopropylamines, alkyl imidazoline derivatives, quaternized amine ethoxylates, quaternary ammonium compounds, etc. Still other suitable cell lysing agents for use herein include biguanide and derivatives thereof, organic sulfur compounds, organic nitrogen compounds, phenyl and phenoxy compounds, phenolic compounds, aldehydes (e.g., glutaraldehyde or formaldehyde), glyoxal, parabens (e.g., ethyl paraben, propyl paraben, or methyl paraben), alcohols, such as aliphatic alcohols having from 1 to 16 carbon atoms, and preferably from 1 to 6 (e.g., methanol, ethanol, propanol, isopropanol, butanol, pentanol, octanol) and aromatic alcohols having from 6 to 30 total carbon atoms (e.g., naphtol), and mixtures thereof.

The rate at which peroxides decompose in an aqueous solution is dependent upon many factors, one of which includes the presence of various metallic impurities, such as iron, manganese, copper and chromium, which may catalyze the decomposition. Because the decolorizing composition is typically exposed to metallic impurities (e.g., calcium ions in water) during use, a metal chelating agent is employed in the present invention in an amount from about 0.05 wt. % to about 10 wt. %, in some embodiments from about 0.1 wt. % to about 5 wt. %, and in some embodiments, from about 0.5 wt. % to about 4 wt. % of the decolorizing composition. Without being limited by theory, it is believed that the metal chelating agent may regulate the exposure of the peroxide to such metal ions and thereby limit the premature release of active peroxide. The chelating agent may also help sequester iron-containing heme groups to ensure the desired color change. The chelating agent may include, for instance, aminocarboxylic acids (e.g., ethylenediaminetetraacetic acid) and salts thereof, hydroxycarboxylic acids (e.g., citric acid, tartaric acid, ascorbic acid, etc.) and salts thereof, polyphosphoric acids (e.g., tripolyphosphoric acid, hexametaphosphoric acid, etc.) and salts thereof, cyclodextrin, and so forth. Desirably, the chelating agent is bifunctional in that it is capable of forming multiple coordination complexes with metal ions to reduce the likelihood that any of the free metal ions will interact with the peroxide. In one embodiment, for example, a bifunctional chelating agent containing two or more iminodiacetic acid groups or salts thereof may be utilized. Iminodiacetic acid groups generally have the following structure:

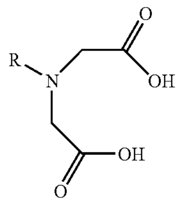

One example of such a bifunctional chelating agent is ethylenediaminetetraacetic acid (EDTA), which has the following general structure:

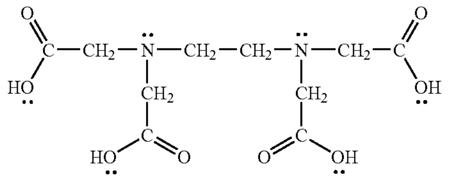

ethylenediaminetetraacetic acid (EDTA)

Examples of suitable EDTA salts include calcium-disodium EDTA, diammonium EDTA, disodium and dipotassium EDTA, triethanolamine EDTA, trisodium and tripotassium EDTA, tetrasodium and tetrapotassium EDTA. Still other examples of similar iminodiacetic acid-based chelating agents include, but are not limited to, butylenediaminetetraacetic acid, (1,2-cyclohexylenediaminetetraacetic acid (CyDTA), diethylenetriaminepentaacetic acid, ethylenediaminetetrapropionic acid, (hydroxyethyl)ethylenediamintriacetic acid (HEDTA), N,N,N',N'-ethylenediaminetetra (methylenephosphonic)acid (EDTMP), triethylenetetraminehexaacetic acid (TTHA), 1,3-diamino-2-hydroxypropane-N,N,N',N'-tetraacetic acid (DHPTA), methyliminodiacetic acid, propylenediaminetetraacetic acid, and so forth.

Due to its strong oxidation potential in aqueous solutions, the peroxide compound tends to attack other components of the decolorizing composition (e.g., cell lysing agent). In this regard, the composition of the present invention also employs an antioxidant in an amount from about 0.0005 wt. % to about 5 wt. %, in some embodiments from about 0.001 wt. % to about 1 wt. %, and in some embodiments, from about 0.005 wt. % to about 0.5 wt. % of the composition. Without intending to be limited by theory, it is believed that the reduction potential of the antioxidant allows it to act as a sacrificial material for oxidation by the peroxide, which allows the other components of the composition to function in their desired capacity in decolorizing a stain. Suitable antioxidants may include, for instance, acetylcysteine, 3-tert-butyl-4-hydroxyanisole, 2,6-di-tert-butyl-p-cresol, tert-butylhydroquinone, caffeic acid, chlorogenic acid, cysteine, cysteine hydrochloride, decylmercaptomethyl-imidazole, diamylhydroquinone, di-tert-butylhydro-quinone, dicetyl thiodipropionate, digalloyl trioleate, dilauryl thiodipropionate, dimyristyl thiodipropionate, dioleyl tocopheryl methylsilanol, disodium rutinyl disulphate, distearyl thiodipropionate, ditridecyl thiodipropionate, dodecyl gallate, erythorbic acid, ethyl ferulate, ferulic acid, hydroquinone, p-hydroxyanisole, hydroxylamine hydrochloride, hydroxylamine sulphate, isooctyl thioglycolate, kojic acid, madecassicoside, methoxy-PEG-7-rutinyl succinate, nordihydroguaiaretic acid, octyl gallate, phenylthioglycolic acid, phloroglucinol, propyl gallate, rosmarinic acid, rutin, sodium erythorbate, sodium thioglycolate, sorbityl furfural, thiodiglycol, thiodiglycolamide, thiodiglycolic acid, thioglycolic acid, thiolactic acid, thiosalicylic acid, tocophereth-5, tocophereth-10, tocophereth-12, tocophereth-18, tocophereth-50, tocophersolan, tocopherol (e.g. vitamin E) and its derivatives (e.g. vitamin E derivatives such as vitamin E acetate, vitamin E linoleate, vitamin E nicotinate and vitamin E succinate), o-tolylbiguanide, tris(nonylphenyl)phosphite, dexpanthenol, alpha-hydroxycarboxylic acids (e.g. glycolic acid, lactic acid, mandelic acid) and salts thereof, p-hydroxybenzoic esters (e.g. methyl, ethyl, propyl or butyl esters thereof), dimethyloldimethylhydantoin, N-acylamino acids and salts thereof (e.g. N-octanoylglycine, Lipacide C8G) and hinokitol. Of these, tocopherols and their derivatives are particularly desirable and may act as physiologically active antioxidants, even in the cell membrane.

Besides those mentioned above, the decolorizing composition of the present invention may also contain a variety of other optional ingredients. For example, the decolorizing composition may contain a preservative or preservative system to inhibit the growth of microorganisms over an extended period of time. Suitable preservatives for use in the present compositions may include, for instance, Kathon CG®, which is a mixture of methylchloroisothiazolinone and methylisothiazolinone available from Rohm & Haas; Neolone 950®, which is methylisothiazolinone available from Rohm & Haas, Mackstat H 66 (available from McIntyre Group, Chicago, Ill.); DMDM hydantoin (e.g., Glydant Plus, Lonza, Inc., Fair Lawn, N.J.); iodopropynyl butylcarbamate; benzoic esters (parabens), such as methylparaben, propylparaben, butylparaben, ethylparaben, isopropylparaben, isobutylparaben, benzylparaben, sodium methylparaben, and sodium propylparaben; 2-bromo-2-nitropropane-1,3-diol; benzoic acid; imidazolidinyl urea; diazolidinyl urea; and the like. Still other preservatives may include ethylhexylglycerin (Sensiva SC 50 by Schulke & Mayr), phenoxyethanol (Phenoxyethanol by Tri-K Industries), caprylyl glycol (Lexgard O by Inolex Chemical Company, Symdiol 68T (a blend of 1,2-Hexanediol, caprylyl glycol and Tropolone by Symrise) and Symocide PT (a blend of phenoxyethanol and Tropolone by Symrise).

The decolorizing composition may also include various other components as is well known in the art, such as binders, colorants, biocides or biostats, electrolytic salts, pH adjusters, etc. Examples of suitable humectants include, for instance, ethylene glycol; diethylene glycol; glycerin; polyethylene glycol 200, 400, and 600; propane 1,3 diol; propylene-glycolmonomethyl ethers, such as Dowanol PM (Gallade Chemical Inc., Santa Ana, Calif.); polyhydric alcohols; or combinations thereof. Various other ingredients for use in a decolorizing composition are described in U.S. Pat. No. 5,681,380 to Nohr, et al. and U.S Pat. No. 6,542,379 to Nohr, et al., which are incorporated herein in their entirety by reference thereto for all purposes.

To form the decolorizing composition, its components are first typically dissolved or dispersed in a solvent (e.g., water).

For example, one or more of the above-mentioned components may be mixed with the solvent, either sequentially or simultaneously, to form the decolorizing composition. Although the actual concentration of the solvent employed will generally depend on the nature of the decolorizing composition and its components, it is nonetheless typically present in an amount from about 50 wt. % to about 99.9 wt. %, in some embodiments from about 60 wt. % to about 99 wt. %, and in some embodiments, from about 75 wt. % to about 98 wt. % of the decolorizing composition.

The method of delivering the decolorizing composition of the present invention to a stain is not critical so long as an effective amount of the peroxide is delivered. For example, the decolorizing composition may be provided in the form of a pump or aerosol spray, gel, stick, cream, lotion, etc. Alternatively, the decolorizing composition may be applied to a solid support for subsequent contact with a stain. The nature of the solid support may vary depending on the intended use, and may include materials such as films, paper, nonwoven webs, knitted fabrics, woven fabrics, foam, glass, etc. Desirably, the solid support is a wipe configured for use on clothing articles or other surfaces, such as a baby wipe, adult wipe, hand wipe, face wipe, cosmetic wipe, household wipe, industrial wipe, personal cleansing wipe, cotton ball, cotton-tipped swab, and so forth.

The wipe may be formed from any of a variety of materials as is well known in the art. For example, the wipe may include a nonwoven web that contains an absorbent material of sufficient wet strength and absorbency for use in the desired application. For example, the nonwoven web may include absorbent fibers formed by a variety of pulping processes, such as kraft pulp, sulfite pulp, thermomechanical pulp, etc. The pulp fibers may include softwood fibers having an average fiber length of greater than 1 mm and particularly from about 2 to 5 mm based on a length-weighted average. Such softwood fibers can include, but are not limited to, northern softwood, southern softwood, redwood, red cedar, hemlock, pine (e.g., southern pines), spruce (e.g., black spruce), combinations thereof, and so forth. Exemplary commercially available pulp fibers suitable for the present invention include those available from Kimberly-Clark Corporation under the trade designations "Longlac-19." Hardwood fibers, such as eucalyptus, maple, birch, aspen, and so forth, can also be used. In certain instances, eucalyptus fibers may be particularly desired to increase the softness of the web. Eucalyptus fibers can also enhance the brightness, increase the opacity, and change the pore structure of the web to increase its wicking ability. Moreover, if desired, secondary fibers obtained from recycled materials may be used, such as fiber pulp from sources such as, for example, newsprint, reclaimed paperboard, and office waste. Further, other absorbent fibers that may be used in the present invention, such as abaca, sabai grass, milkweed floss, pineapple leaf, cellulosic esters, cellulosic ethers, cellulosic nitrates, cellulosic acetates, cellulosic acetate butyrates, ethyl cellulose, regenerated celluloses (e.g., viscose or rayon), and so forth.

Synthetic thermoplastic fibers may also be employed in the nonwoven web, such as those formed from polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. Because many synthetic thermoplastic fibers are inherently hydrophobic (i.e., non-wettable), such fibers may optionally be rendered more hydrophilic (i.e., wettable) by treatment with a surfactant solution before, during, and/or after web formation. Other known methods for increasing wettability may also be employed, such as described in U.S. Pat. No. 5,057,361 to Sayovitz, et al., which is incorporated herein in its entirety by reference thereto for all purposes.

If desired, the nonwoven web material may be a composite that contains a combination of synthetic thermoplastic polymer fibers and absorbent fibers, such as polypropylene and pulp fibers. The relative percentages of such fibers may vary over a wide range depending on the desired characteristics of the nonwoven composite. For example, the nonwoven composite may contain from about 1 wt. % to about 60 wt. %, in some embodiments from 5 wt. % to about 50 wt. %, and in some embodiments, from about 10 wt. % to about 40 wt. % synthetic polymeric fibers. The nonwoven composite may likewise contain from about 40 wt. % to about 99 wt. %, in some embodiments from 50 wt. % to about 95 wt. %, and in some embodiments, from about 60 wt. % to about 90 wt. % absorbent fibers.

Nonwoven composites may be formed using a variety of known techniques. For example, the nonwoven composite may be a "coform material" that contains a mixture or stabilized matrix of thermoplastic fibers and a second non-thermoplastic material. As an example, coform materials may be made by a process in which at least one meltblown die head is arranged near a chute through which other materials are added to the web while it is forming. Such other materials may include, but are not limited to, fibrous organic materials such as woody or non-woody pulp such as cotton, rayon, recycled paper, pulp fluff and also superabsorbent particles, inorganic and/or organic absorbent materials, treated polymeric staple fibers and so forth. Some examples of such coform materials are disclosed in U.S. Pat. No. 4,100,324 to Anderson, et al.; U.S. Pat. No. 5,284,703 to Everhart, et al.; and U.S. Pat. No. 5,350,624 to Georger, et al.; which are incorporated herein in their entirety by reference thereto for all purposes. Alternatively, the nonwoven composite may be formed be formed by hydraulically entangling fibers and/or filaments with high-pressure jet streams of water. Hydraulically entangled nonwoven composites of staple length fibers and continuous filaments are disclosed, for example, in U.S. Pat. No. 3,494,821 to Evans and U.S. Pat. No. 4,144,370 to Bouolton, which are incorporated herein in their entirety by reference thereto for all purposes. Hydraulically entangled nonwoven composites of a continuous filament nonwoven web and pulp fibers are disclosed, for example, in U.S. Pat. No. 5,284,703 to Everhart, et al. and U.S. Pat. No. 6,315,864 to Anderson, et al., which are incorporated herein in their entirety by reference thereto for all purposes.

Regardless of the materials or processes utilized to form the wipe, the basis weight of the wipe is typically from about 20 to about 200 grams per square meter (gsm), and in some embodiments, between about 35 to about 100 gsm. Lower basis weight products may be particularly well suited for use as light duty wipes, while higher basis weight products may be better adapted for use as industrial wipes. The wipe may assume a variety of shapes, including but not limited to, generally circular, oval, square, rectangular, or irregularly shaped. Each individual wipe may be arranged in a folded configuration and stacked one on top of the other to provide a stack of wet wipes. Such folded configurations are well known to those skilled in the art and include c-folded, z-folded, quarter-folded configurations and so forth. For example, the wipe may have an unfolded length of from about 2.0 to about 80.0 centimeters, and in some embodiments, from about 10.0 to about 25.0 centimeters. The wipes may likewise have an unfolded width of from about 2.0 to about 80.0 centimeters, and in some embodiments, from about 10.0 to about 25.0 centimeters. The stack of folded wipes may be placed in the interior of a container, such as a plastic tub, to provide a package of wipes for eventual sale to the consumer. Alternatively, the wipes may include a continuous strip of material which has perforations between each wipe and which may be arranged in a stack or wound into a roll for dispensing. Various suitable dispensers, containers, and systems for delivering wipes are described in U.S. Pat. No. 5,785,179 to Buczwinski, et al.; U.S. Pat. No. 5,964,351 to Zander; U.S. Pat. No. 6,030,331 to Zander; U.S. Pat. No. 6,158,614 to Haynes, et al.; U.S. Pat. No. 6,269,969 to Huang, et al.; U.S. Pat. No. 6,269,970 to Huang, et al.; and U.S. Pat. No. 6,273,359 to Newman, et al., which are incorporated herein in their entirety by reference thereto for all purposes.

In certain embodiments of the present invention, the decolorizing composition is incorporated into a wet wipe solution for application to the wipe. The wet wipe solution may, if desired, include other components for cleaning, disinfecting, sanitizing, etc., such as described in U.S. Pat. No. 6,440,437 to Krzysik, et al.; U.S. Pat. No. 6,028,018 to Amundson, et al.; U.S. Pat. No. 5,888,524 to Cole; U.S. Pat. No. 5,667,635 to Win, et al.; and U.S. Pat. No. 5,540,332 to Kopacz, et al., which are incorporated herein in their entirety by reference thereto for all purposes. The wet wipe solution may be application using any suitable method known in the art, such as spraying, dipping, saturating, impregnating, brush coating, and so forth. The amount of the wet wipe solution employed may depending upon the type of wipe material utilized, the type of container used to store the wipes, the nature of the cleaning formulation, and the desired end use of the wipes. Generally, each wipe contains from about 150 wt. % to about 600 wt. %, in some embodiments from about 200 wt. % to about 550 wt. %, and in some embodiments, from about 300 wt. % to about 500 wt. % of a wet wipe solution based on the dry weight of the wipe.

According to the present invention, a stain that is treated with the decolorizing composition can be discharged or neutralized within a period of about 30 minutes or less, in some embodiments about 15 minutes or less, and in some embodiments, about 5 minutes or less. The resulting color change may be observed visually or detected with an optical reader, such as one that relies upon colorimetry as described below.

The present invention may be better understood with reference to the following examples.

Test Methods

Aging was performed on 4.5 gram liquid samples and wipes loaded with 330% add-on level of the formulation. The liquid samples were placed in a 40° C. and 50° C. oven as well as kept at room temp with pull points at 1 week, 2 weeks, 4 weeks, 6 weeks and 8 weeks. The wipes were wetted with 330% of add-on, compressed to make sure that the wipes take up the fluid (i.e., rolled like with a rolling pin), wrapped in tin foil with the seams taped, placed into a sealable plastic bag and placed in 40° C., 50° C. ovens, and at room temperature. The pull points for the wipes are at 2 weeks, 4 weeks and 6 weeks. After aging, $H_2O_2$ concentration was analytically detected using conventional techniques. More specifically, a titanium salt was added to the test solutions to induce a color change. The absorbance reading of the resulting sample was then detected via spectrophotometry, wherein the intensity of the reading is proportional to $H_2O_2$ concentration.

EXAMPLE 1

The ability to form a stable peroxide decolorizing composition was demonstrated. More specifically, twelve decolorizing samples (Samples 1-6) were formed with a composition as set forth below in Table 1.

TABLE 1

Composition of Samples 1-6

| Component | % by Weight in Formula |
|---|---|
| Water | 98.1 |
| Potassium Laureth Phosphate | 0.60 |
| Polysorbate 20 | 0.30 |
| Tetrasodium EDTA | 0.20 |
| Tocopheryl Acetate | 0.001 |
| Hydrogen Peroxide | 0.60 |
| Preservatives and additional non-active components | 0.199 |

Samples 1-3 were liquid samples prepared by adding the components of the formulation to a beaker and mixing until homogenous. 4.5 grams of the formulation was placed into several small vials (enough for 1 per pull point per sample) and placed at the appropriate temperature for evaluation. Samples 4-6 were coform wipe samples (enough for 1 wipe per pull point) applied with a solution at 330% of the dry weight, wrapped in foil with the seams taped, placed in a plastic bag and added to the appropriate temperature environment (40° C., 50° C. or room temp). Once formed, Samples 1-6 were aged at various temperatures (ambient temperature, 40° C., and 50° C.) as described above. The results are set forth below in Table 2.

TABLE 2

Hydrogen Peroxide Concentration of Aged Samples

| | | | After 1 week | | After 2 weeks | | After 4 weeks | |
|---|---|---|---|---|---|---|---|---|
| Sample | Aging Temperature (° C.) | % $H_2O_2$ in Solution (initial) | % $H_2O_2$ in Solution | % of Initial | % $H_2O_2$ in Solution | % of Initial | % $H_2O_2$ in Solution | % of Initial |
| 1 | Room | 0.68% | 0.62% | 91% | 0.67% | 99% | 0.58% | 85% |
| 2 | 40 | 0.68% | 0.58% | 85% | 0.63% | 93% | 0.55% | 81% |
| 3 | 50 | 0.68% | 0.56% | 82% | 0.54% | 79% | 0.41% | 60% |
| 4 | Room | 0.66% | 0.63% | 95% | 0.68% | 103% | 0.67% | 102% |
| 5 | 40 | 0.57% | — | — | 0.51% | 89% | — | — |

TABLE 2-continued

Hydrogen Peroxide Concentration of Aged Samples

| Sample | Aging Temperature (° C.) | % $H_2O_2$ in Solution (initial) | After 1 week % $H_2O_2$ in Solution | After 1 week % of Initial | After 2 weeks % $H_2O_2$ in Solution | After 2 weeks % of Initial | After 4 weeks % $H_2O_2$ in Solution | After 4 weeks % of Initial |
|---|---|---|---|---|---|---|---|---|
| 6 | 50 | 0.42% | — | — | 0.13% | 31% | — | — |
| 7 | Room | 0.68% | 0.62% | 91% | 0.67% | 99% | 0.58% | 85% |
| 8 | 40 | 0.68% | 0.58% | 85% | 0.63% | 93% | 0.55% | 81% |
| 9 | 50 | 0.68% | 0.56% | 82% | 0.54% | 79% | 0.41% | 60% |
| 10 | Room | 0.66% | 0.63% | 95% | 0.68% | 103% | 0.67% | 102% |
| 11 | 40 | 0.57% | — | — | 0.51% | 89% | — | — |
| 12 | 50 | 0.42% | — | — | 0.13% | 31% | — | — |

** Samples too dry to extract any solution.

EXAMPLE 2

Twelve samples (Samples 7-16) were formed as set forth below in Tables 3 and 4.

TABLE 3

Composition of Samples 7-11

| Component | % by Weight in Formula |
|---|---|
| Water | 95.4 |
| Sodium Lauryl Sulfate | 0.60 |
| Tetrasodium EDTA | 2 |
| Urea Hydrogen Peroxide Adduct | 2 |

TABLE 4

Composition of Samples 12-16

| Component | % by Weight in Formula |
|---|---|
| Water | 96.8 |
| Sodium Lauryl Sulfate | 0.60 |

TABLE 4-continued

Composition of Samples 12-16

| Component | % by Weight in Formula |
|---|---|
| Tetrasodium EDTA | 2 |
| Hydrogen Peroxide | 0.60 |

Samples 7-11 were liquid samples prepared by adding the components of the formulation to a beaker and mixing until homogenous. 4.5 grams of the formulation was placed into several small vials (enough for 1 per pull point per sample) and placed at the appropriate temperature for evaluation. Samples 12-16 were coform wipe samples (enough for 1 wipe per pull point) applied with a solution at 330% of the dry weight, wrapped in foil with the seams taped, placed in a plastic bag and added to the appropriate temperature environment (40° C., 50° C. or room temp). Once formed, Samples 7-16 were aged at various temperatures (ambient temperature, 40° C., and 50° C.) as described above. The results are set forth below in Table 5.

TABLE 5

Hydrogen Peroxide Concentration of Aged Samples

| Sample | Aging Temperature (° C.) | % $H_2O_2$ in Solution (initial) | After 1 week % $H_2O_2$ in Solution | After 1 week % of Initial | After 2 weeks % $H_2O_2$ in Solution | After 2 weeks % of Initial |
|---|---|---|---|---|---|---|
| 7 | Room | 0.54% | 0.37% | 69% | 0.35% | 65% |
| 8 | 40 | 0.54 | 0.17% | 31% | 0.09% | 13% |
| 9 | 50 | 0.54 | <0.02% | <4% | <0.02% | <4% |
| 10 | 40 | 0.68% | 0.09% | 13% | 0.05% | 7.4% |
| 11 | 50 | 0.68% | <0.02% | <4% | 0.06% | 8.8% |
| 12 | Room | 0.34% | 0.10% | 29% | 0.07% | 21% |
| 13 | 40 | 0.34% | 0.03% | 8.8% | <0.02% | <4% |
| 14 | 50 | 0.34% | <0.02% | <4% | <0.02% | <4% |
| 15 | 40 | 0.36% | 0.03% | 8.3% | 0.04% | 11% |
| 16 | 50 | 0.54% | <0.02% | <4% | ** | — |

** Samples too dry to extract any solution.

As indicated in Table 5, the stability of the samples formed without an antioxidant (Samples 7-16) was not as good as the samples formed with an antioxidant (Samples 1-6, Table 4).

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A decolorizing composition comprising hydrogen peroxide in an amount from about 0.4 wt. % to about 5 wt. %, from about 0.1 wt. % to about 10 wt. % of at least one surfactant, from about 0.05 wt. % to about 10 wt. % of at least one chelating agent, from about 0.0005 wt. % to about 5 wt. % of at least one antioxidant, and from about 50 wt. % to about 99.9 wt. % of water, wherein the decolorizing composition reacts with hemoglobin in blood to alter the red color of the hemoglobin.

2. The decolorizing composition of claim 1, wherein hydrogen peroxide constitutes from about 0.5 wt. % to about 4 wt. % of the decolorizing composition.

3. The decolorizing composition of claim 1, wherein the chelating agent includes an aminocarboxylic acid, a salt of an aminocarboxylic acid, or a combination thereof.

4. The decolorizing composition of claim 1, wherein the antioxidant includes a tocepherol or derivative thereof.

5. A wipe comprising:

a nonwoven web; and an aqueous solution that constitutes from about 150 wt. % to about 600 wt. % of the dry weight of the wipe, wherein the solution comprises hydrogen peroxide in an amount of from about 0.4 wt. % to about 5 wt., the solution further comprising at least one surfactant, at least one chelating agent, and at least one antioxidant, wherein the solution reacts with hemoglobin in blood to alter the red color of the hemoglobin.

6. The wipe of claim 5, wherein hydrogen peroxide constitutes from about 0.5 wt. % to about 4 wt .% of the aqueous solution.

7. The wipe of claim 5, wherein the chelating agent includes an aminocarboxylic acid, a salt of an aminocarboxylic acid, or a combination thereof.

8. The wipe of claim 7, wherein the chelating agent includes ethylenediaminetetraacetic acid (EDTA), a salt of ethylenediaminetetraacetic acid (EDTA), or a combination thereof.

9. The wipe of claim 5, wherein the antioxidant includes a tocepherol or derivative thereof.

10. The wipe of claim 5, wherein the antioxidant constitutes from about 0.001 wt. % to about 1 wt. % of the aqueous solution.

11. The wipe of claim 5, wherein the aqueous solution constitutes from about 200 wt. % to about 550 wt. % of the dry weight of the wipe.

12. The wipe of claim 5, wherein the solution is capable of maintaining about 70% or more of its initial hydrogen peroxide content subsequent to being aged at ambient temperature for 2 weeks.

13. The decolorizing composition of claim 1, wherein the chelating agent constitutes from about 0.1 wt. % to about 5 wt. % of the decolorizing composition.

14. The decolorizing composition of claim 1, wherein the chelating agent includes ethylenediaminetetraacetic acid (EDTA), a salt of ethylenediaminetetraacetic acid (EDTA), or a combination thereof.

15. The decolorizing composition of claim 1, wherein the antioxidant includes vitamin E acetate, vitamin E linoleate, vitamin E nicotinate, vitamin E succinate, or a combination thereof.

16. The decolorizing composition of claim 1, wherein the antioxidant constitutes from about 0.001 wt. % to about 1 wt, % of the decolorizing composition.

17. The decolorizing composition of claim 1, wherein the composition is capable of maintaining about 70% or more of its initial hydrogen peroxide content subsequent to being aged at ambient temperature for 2 weeks.

18. A wipe comprising:

a nonwoven web; and a decolorizing composition that contains hydrogen peroxide in an amount from about 0.4 wt. % to about 5 wt. %, from about 0.1 wt. % to about 10 wt. % of at least one surfactant, from about 0.05 wt. % to about 10 wt. % of at least one chelating agent, from about 0.0005 wt. % to about 5 wt. % of at least one antioxidant, and from about 50 wt. % to about 99.9 wt. % of water, wherein the decolorizing composition reacts with hemoglobin in blood to alter the red color of the hemoglobin.

19. The wipe of claim 18, wherein hydrogen peroxide constitutes from about 0.5 wt. % to about 4 wt. % of the decolorizing composition.

20. The wipe of claim 18, wherein the chelating agent includes ethylenediaminetetraacetic acid (EDTA), a salt of ethylenediaminetetraacetic acid (EDTA), or a combination thereof.

21. The wipe of claim 18, wherein the antioxidant includes a tocepherol or derivative thereof.

22. The wipe of claim 18, wherein the chelating agent constitutes from about 0.1 wt. % to about 5 wt. % of the decolorizing composition.

23. The wipe of claim 18, wherein the antioxidant includes vitamin E acetate, vitamin E linoleate, vitamin E nicotinate, vitamin E succinate, or a combination thereof.

24. The wipe of claim 18, wherein the antioxidant constitutes from about 0.001 wt. % to about 1 wt. % of the decolorizing composition.

25. The wipe of claim 18, wherein the composition is capable of maintaining about 70% or more of its initial hydrogen peroxide content subsequent to being aged at ambient temperature for 2 weeks.

* * * * *